Aug. 27, 1968     C. W. SMITH     3,398,843
AIRPLANE HANGAR Filed May 23, 1966     7 Sheets-Sheet 2

FIG-2

INVENTOR
CLARK W. SMITH

BY *Hood, Gust & Irish*

ATTORNEYS

Aug. 27, 1968  C. W. SMITH  3,398,843
AIRPLANE HANGAR
Filed May 23, 1966  7 Sheets-Sheet 3

INVENTOR
CLARK W. SMITH
BY Hood, Gust & Irish

ATTORNEYS

Aug. 27, 1968 C. W. SMITH 3,398,843
AIRPLANE HANGAR
Filed May 23, 1966 7 Sheets-Sheet 7

INVENTOR
CLARK W. SMITH
BY Hood Gust & Irish

ATTORNEYS

United States Patent Office 3,398,843
Patented Aug. 27, 1968

3,398,843
AIRPLANE HANGAR
Clark W. Smith, R.R. 4, Decatur, Ind. 46733
Filed May 23, 1966, Ser. No. 551,983
19 Claims. (Cl. 214—16.1)

ABSTRACT OF THE DISCLOSURE

A vehicle storage device having a turntable rotatably mounted on an upright and substantially rigid post. The turntable has at least one vehicle stall thereon, and in a specific embodiment, the stall is especially adapted to hold an aircraft. The storage device can be placed within a building if desired. A ramp can be positioned adjacent the peripheral edge of the turntable such that a vehicle can be positioned thereon and can be removed therefrom when desired. The turntable can be provided with means for holding the vehicle stall in registry with the ramp and for bridging any gap there may be between the ramp and the turntable. Also the turntable can be provided with means for adjusting the stall such that a number of different kinds of vehicles can be supported by the stall and such that portions of the stall can be raised and lowered relative to a ramp such that the ramp and the stall can be positioned to approximate portions of a continuous surface thereby facilitating the placing of a vehicle on the stall and the removing of a vehicle from the stall. In the specific embodiment above-mentioned, the turntable can be provided with four aircraft stalls.

---

The present invention relates to an improved hangar for aircraft, and more specifically, to a hangar having a rotatable aircraft support upon which several aircraft can be stored, loaded and unloaded therefrom through a single hangar opening.

Heretofore the most inexpensive and widely used hangar for aircraft storage has been the so-called T-type hangar. The popularity of T-type hangar has been primarily due to their relatively low cost and the relatively efficient use of space within such a hangar. However, T-type hangars require doors on opposite sides of the hangar and taxi strips adjacent thereto since the aircraft are stored alternately to face the opposite sides of the hangar and are removed from the hangar nose first. For this reason, T-type hangars even when arranged in the most favorable manner, require four times as many doors and about nine times as much taxi strip as a hangar would require if all of the aircraft could be removed from the same side of the hangar. However, no simply constructed and relatively inexpensive hangar has been proposed which both: (1) allows all of the aircraft stored in the hangar to be removed from the same side of the hangar, and thus, requires fewer doors and less taxi strip than a T-type hangar, and (2) utilizes hangar space as efficiently as a T-type hangar. It is therefore desirable to provide a simple and relatively inexpensive hangar construction which can be used to store all conventional gear and tricycle gear aircraft, whether high wing or low wing, which utilizes hangar space at least as efficiently as a conventional T-type hangar, and which requires fewer hangar doors and less taxi strip than conventional T-type hangar storage.

Also desirable is the provision of an improved hangar construction which stores the aircraft in a manner allowing the aircraft to be stored within or removed from the hangar without requiring the moving of adjacent aircraft. Whenever aircraft have to be shuffled about within a hangar, experience indicates that sooner or later the aircraft will become damaged by colliding with adjacent aircraft. This likelihood of damage is normally reflected in the cost of insuring aircraft. Conventionally, insurance rates fluctuate depending upon the type of hangar used to store the insured aircraft; and thus, in addition to facilitating the removal of a single aircraft from the hangar and probably reducing the labor cost involved in running an airport, the use of such a hangar will decrease the cost of insuring aircraft stored therein.

It is still further desirable to provide an improved hangar which can be relatively inexpensively manufactured and erected and which will allow airports more efficiently to use available land thereby permitting airports to provide hangar facilities without necessitating a relatively large capital expenditure. A hangar which allows all of the aircraft stored in the hangar to be removed from the same side of the hangar would require about one third the ground area required by T-type hangars and the requisite taxi strip arranged in the most favorable manner, and would allow the more efficient use of airport land as such hangars can be arranged to back up to airport property boundaries, fences, walls, buildings, or similar limits to land use.

It is therefore the primary object of this invention to provide an improved aircraft hangar construction.

Another object of the invention is to provide an improved hangar construction which can be relatively inexpensively fabricated and erected.

Also an object of this invention is to provide an improved hangar construction which utilizes hangar space at least as efficiently as conventional T-type hangars and which permits each aircraft stored within the hangar to be positioned within and removed from the hangar through an opening in the same side of the hangar thereby minimizing the number of doors and taxi strip required and permitting the hangar to be positioned backed up to a peripheral boundary of the property on which the hangar is located or other buildings.

Yet another object of this invention is to provide an improved hangar construction which utilizes hangar space at least as efficiently as conventional T-type hangars and which stores aircraft in a manner that each aircraft can be removed from the hanger without moving adjacent aircraft.

Still another object of this invention is to provide an improved hanger construction which more efficiency utilizes ground space available for hangars.

A further object of this invention is to provide an improved hangar construction comprising a rotatable aircraft support upon which several aircraft can be stored in spaced relation thereby providing that each of the aircraft can be loaded and unloaded from the support through a common hangar opening whereby both hangar doors and taxi strip will be minimized.

Still further an object of this invention is to provide an improved hangar construction comprising a rotatable aircraft support upon which several aircraft can be stored in spaced relation and which is directly connected solely to a rigid vertical post passing through the center thereof.

The above-mentioned and other features and objects of this invention and the manner of attaining them will become more apparent and the invention itself will be best understood by reference to the following description of an embodiment of the invention taken in conjunction with the accompanying drawings, wherein:

FIG. 6 is a top view of the aircraft support, the ramp associated with the same, and the footings of the improved hangar construction of this invention illustrated in FIGS. 1 through 4;

In the broader aspects of this invention there is provided an improved aircraft storage device comprising an upright post and a generally horizontal aircraft support connected to the post. The support is spaced from the ground and entirely unsupported from the ground radially outwardly from the post. The support is rotatable about the axis of the post such that several aircraft can be placed on and taken from the support at the same position.

Referring now to the drawings, and more specifically to FIGS. 1 through 12, there is shown an improved hangar comprising a building 10, an aircraft support 12, and a ramp 14. Building 10 comprises a generally cylindrical side wall portion 16, a generally conical roof portion 18 resting on the wall portion 16 and closing the top opening 17 thereof, and an annular footing 20 upon which the wall portion 16 rests. Wall portion 16, at one position, has an opening 22 therein which is sufficiently large to move aircraft therethrough and which is selectively closeable by means of a door 23. Annular footing 20 extends under the entire wall portion 16 and ends adjacent to the peripheral boundaries of the opening 22 therein. In registry with the opening 22 and connected to the opposite ends of the footing 20 is a ramp 14. Ramp 14 cooperates with the support 12, and thus, will be described in more detail hereinafter.

Referring specifically to FIGS. 1 through 6, there is shown the specific construction of building 10. The roof 18 comprises radially extending main roof beams 170, octagonally extending purlins 172 between the main roof beams adjacent the center 174 thereof, secondary roof beams 176 extending radially outwardly from the purlins 172 most distant from the center 174 and intermediate the main roof beams 170, and purlins 178 extending between the radially extending roof beams 170 and 176. Overlaying the roof beams 170 and 176 and the purlins 172 and 178 is the roofing 180 which is preferably provided in sheets which overlay each other adjacent the peripheral boundaries thereof and are secured to the roof beams and purlins 170, 172, 176 and 178. Thus consrtucted, the roof 18 is secured to both the wall portion 16 adjacent to the periphery thereof and to the post 28 of the turntable 12.

Figure 4:
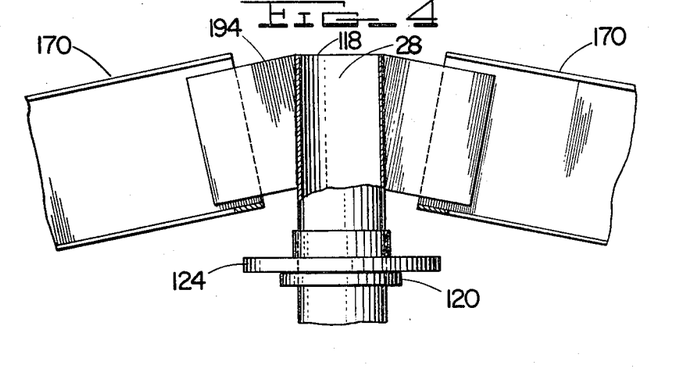
FIG. 4 is an enlarged fragmentary and partially broken away view of the connection between the roof and the vertical post of the improved hangar construction of this invention illustrated in FIGS. 1 through 3 and showing the top bearing thereof.

Referring now to FIG. 4, there is shown the specific manner by which the roof 18 is secured to the top of the post 28. There is shown two of the main roof beams 170 adjacent the post 28 secured to gusset plates 194 which are in turn welded to the post adjacent to the top end 118 thereof. This securance of the two main roof beams 170 is representative of each of the roof beams 170, and all eight of the roof beams 170 are secured to the post 28 in the same manner to extend radially therefrom. Directly beneath the securance of the gusset plates 194 to the post 28 is the securance of the collar 120 which supports the bearing 124, both of which will be mentioned hereinafter.

Figure 1:
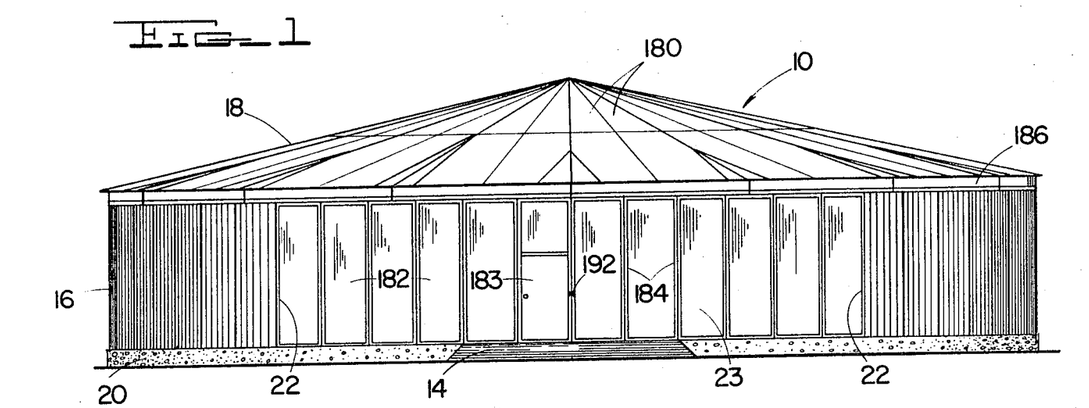
FIG. 1 is a front elevational view of the exterior of one embodiment of the improved hangar construction of this invention looking directly at the hangar opening and the door closing the same.
Figure 2:
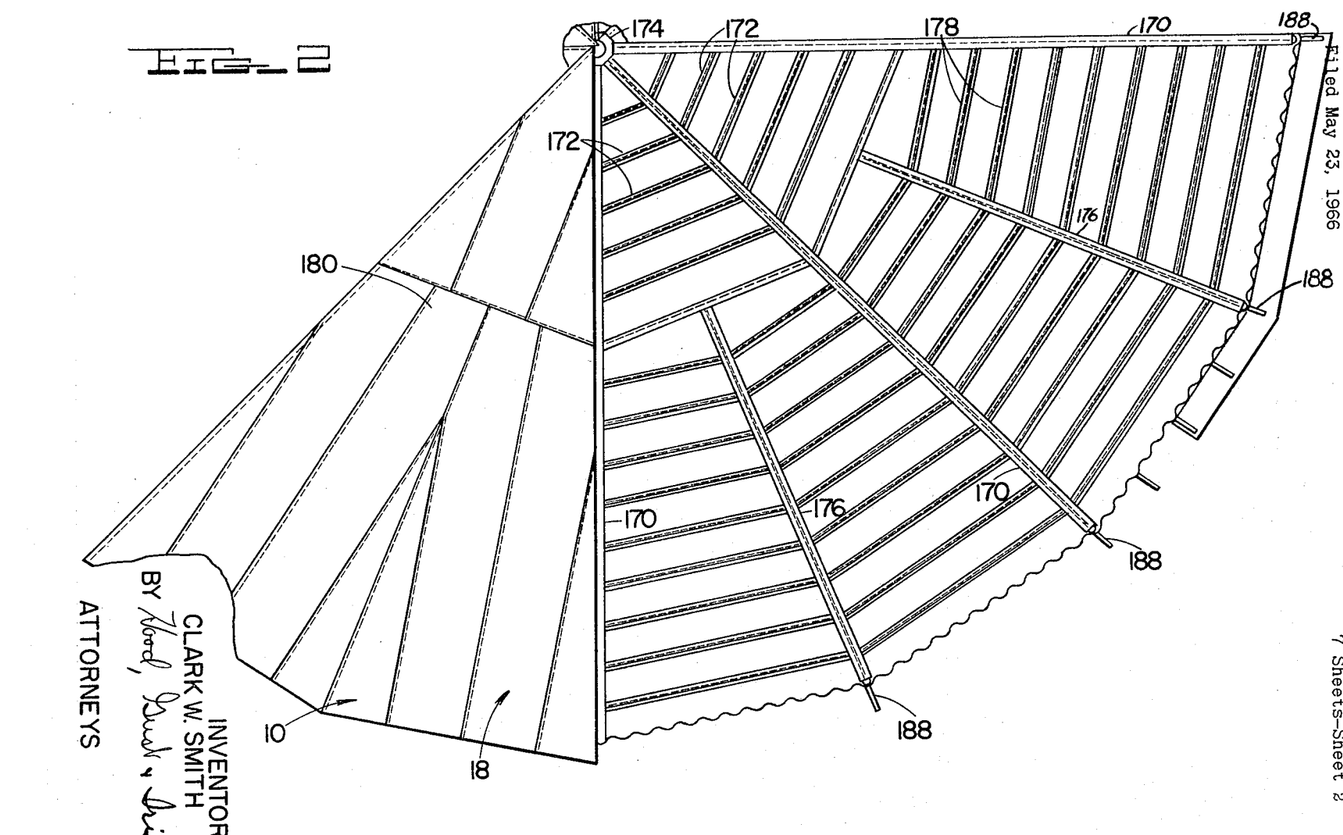
FIG. 2 is a fragmentary and partially broken away top view of the improved hangar illustrated in FIG. 1 showing primarily the roof construction thereof.
Figure 3:
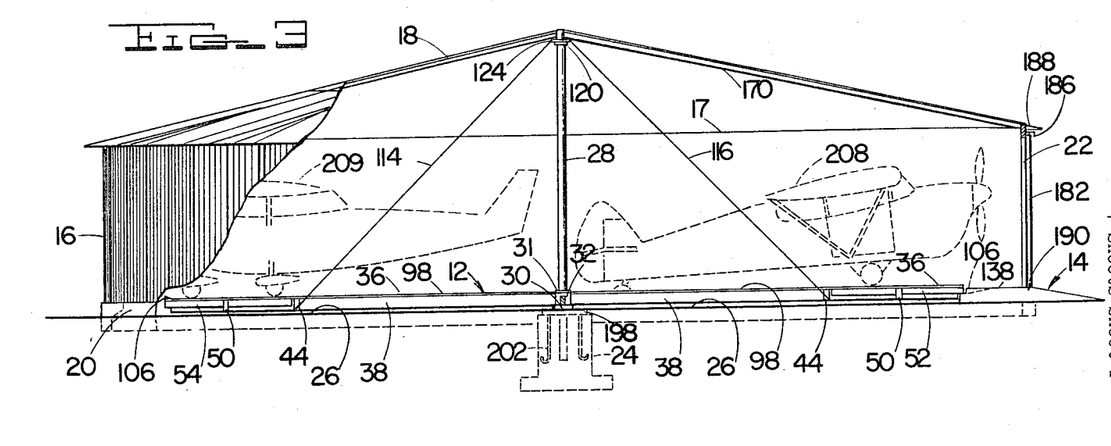
FIG. 3 is a side view, partially broken away, of the improved hangar construction illustrated in FIGS. 1 and 2, showing the footings, ramp, and aircraft support thereof.

In the specific embodiment illustrated in FIGS. 1 through 3, door 23 which is provided for selectively closing the opening 22 in the wall portion 16, comprises a plurality of vertically extending elongated panels 182, one of which has a walk door 183 therein, which are hinged together at the longitudinal boundaries 184 thereof, and which together are hung from a door track 186 connected to the overhang 188 of the roof beams 170 and 176 above-mentioned and shown in FIG. 3. Shown in FIG. 3 is a bottom door track 190 which merely guides the door panels 182 and keeps them vertically disposed. Thus constructed, the door 23 opens in the center 192 thereof and each half of the door 23 rolls on the track 186 into overlaying relationship with the wall portion 16 to uncover the opening 22.

Figure 5:
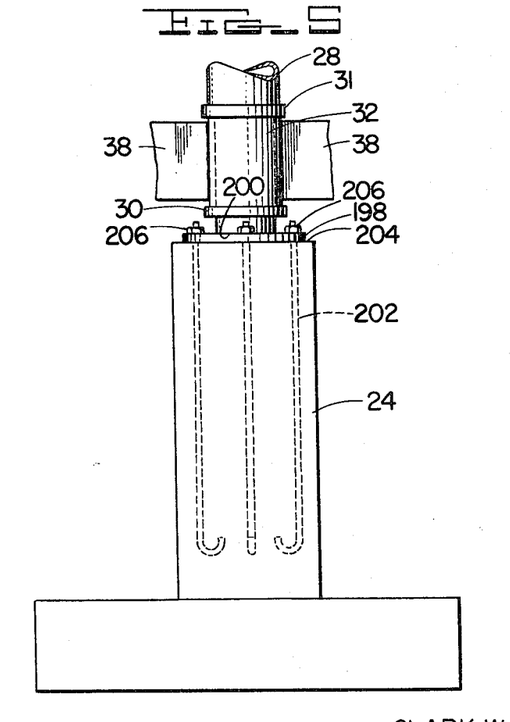
FIG. 5 is an enlarged fragmentary view of the central footing, the vertical post, and the lower bearing of the improved hangar construction of this invention illustrating the means by which the post is secured to the footing and the aircraft support is secured to the post.
Figures 7, 9, 10:
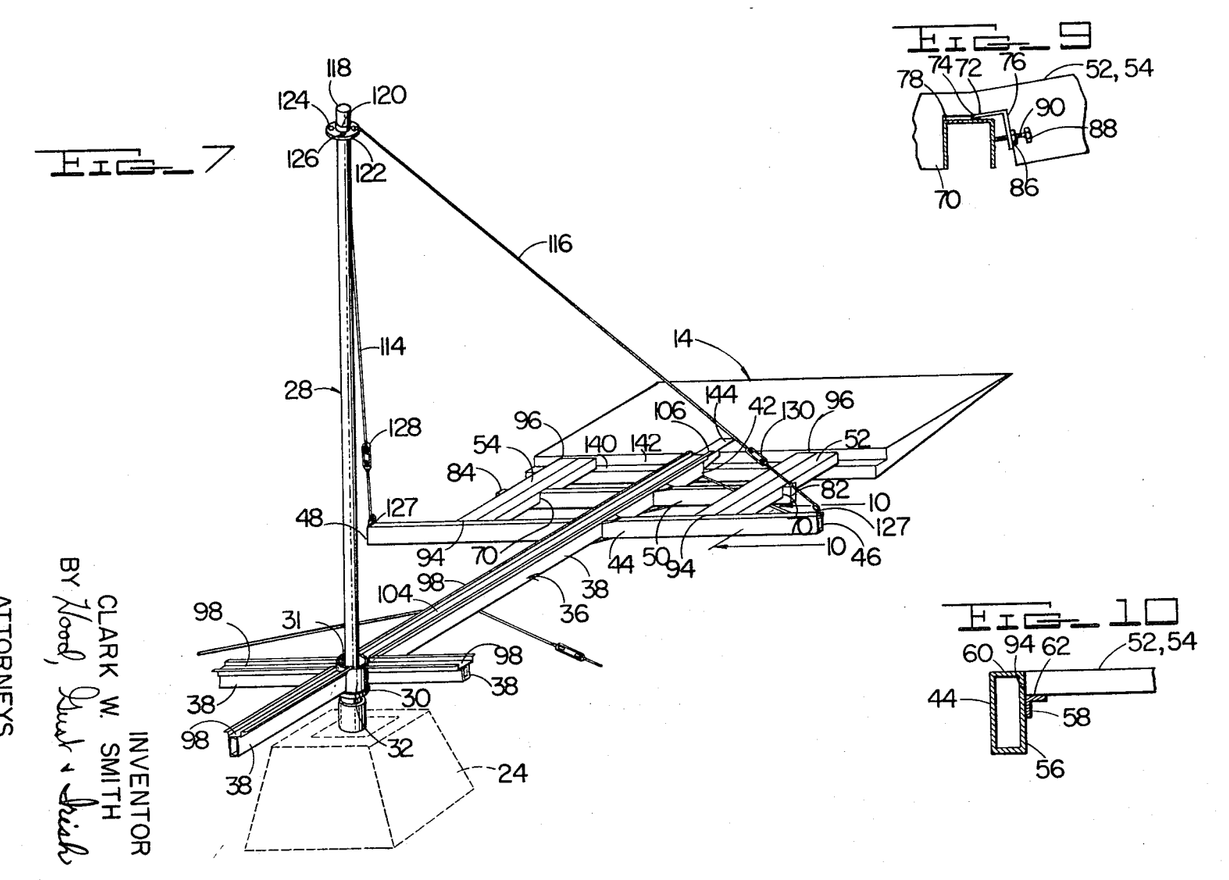
FIG. 7 is a perspective fragmentary view of the aircraft support illustrated in FIGS. 3 through 6 showing one of the airplane stalls of the support positioned in registry with the ramp associated therewith.
FIG. 9 is a fragmentary end view of the adjustment means illustrated in FIG. 8 taken substantially along the section line 9—9 in FIG. 8.
FIG. 10 is a fragmentary and cross-sectional view of the means by which one end of the aircraft wheel-supporting members are supported taken substantially along the section line 10—10 of FIG. 7.
Figures 8, 12:
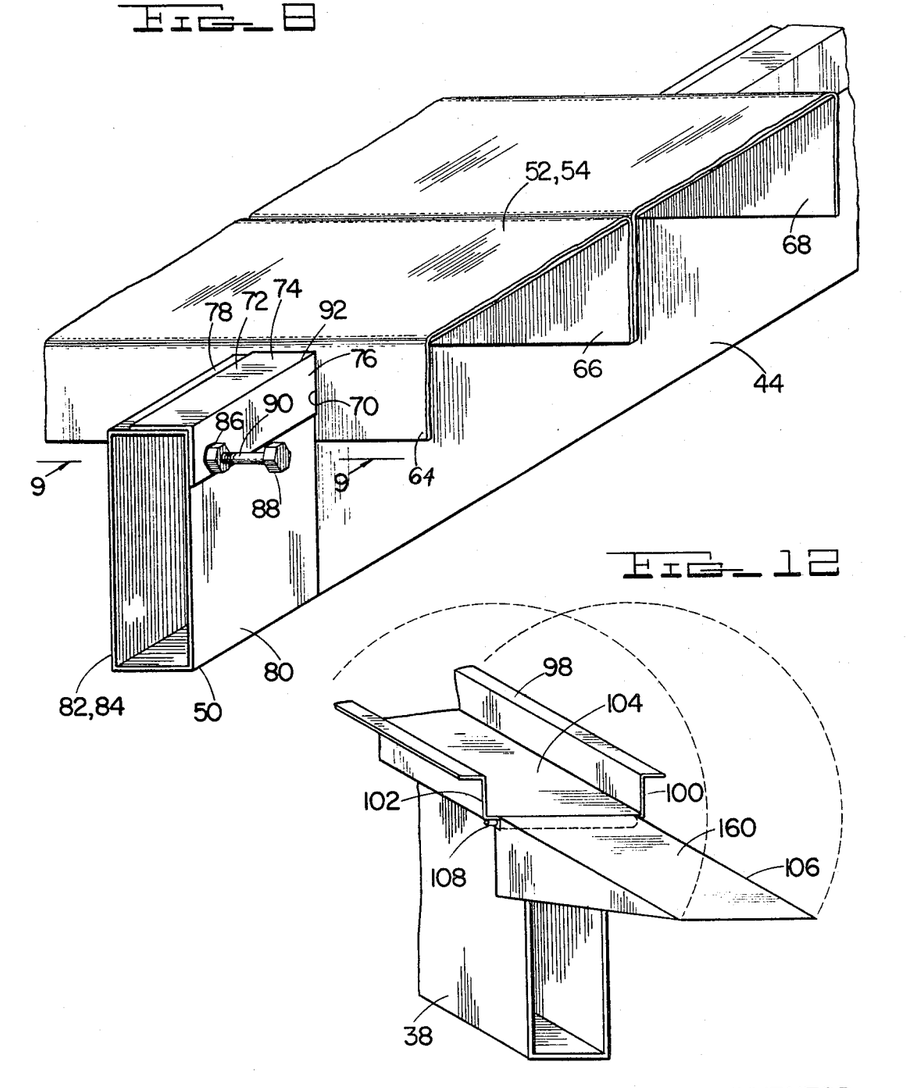
FIG. 8 is a fragmentary, perspective view of the means by which the most distal end of the aircraft support can be adjusted in height.
FIG. 12 is an enlarged fragmentary and perspective view of the load-bearing member of one of the aircraft stalls of the aircraft support illustrating the locking means illustrated in FIG. 11.
Figure 11:
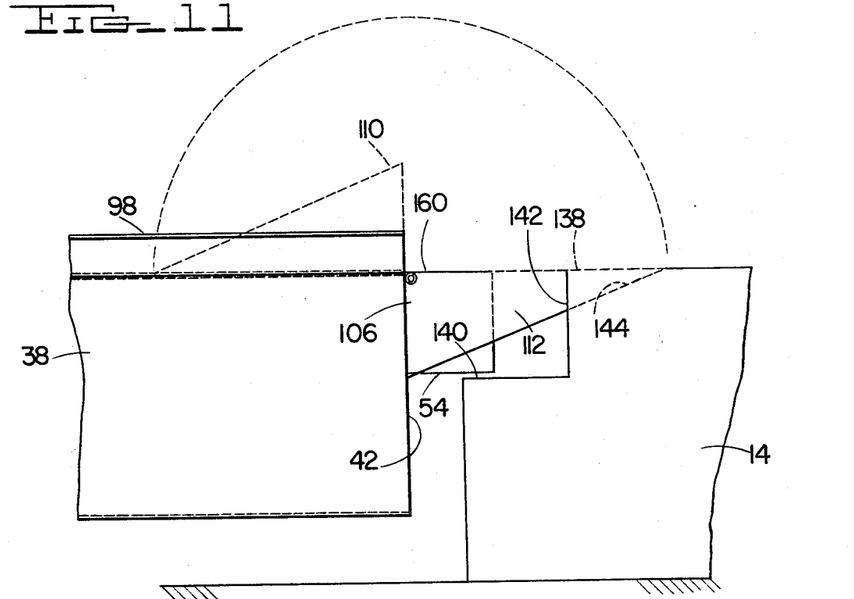
FIG. 11 is a fragmentary view of the aircraft support and the ramp associated therewith illustrated in FIGS. 3 through 10 showing the load-bearing member of one of the aircraft stalls of the support in registry with the ramp and illustrating the means by which each stall of the support can be locked in loading or unloading position.

Referring now to FIGS. 3, 5 and 6 and the structure of the aircraft support 12, there is shown a central footing 24 which is embedded in the ground and extends well beneath the frost line. Radially outwardly from the footing 24 the ground is levelled to the level 26 of the top 204 of the footing 24. Secured to the footing 24 to upstand from the footing 24 in a generally vertical position is a rigid post 28. Secured to the rigid post 28 adjacent to the footing 24 is a collar 30. Resting upon collar 30 is a thrust bearing 32 which is rotatable about the post 28 and which is supported by the collar 30 and a spaced apart collar 31.

Referring to FIG. 5, the footing 24 and the method by which the post 28 is secured thereto is shown. A plate 198 is welded to the bottom end 200 of the post 28 generally perpendicular to the axis of the post 28. Plate 198 is in turn secured to the footing 24 by means of a plurality of elongated bolts 202 which are embedded within the footing 24 and extend upwardly from the top surface 204. Plate 198 is positioned on surface 204 and is secured to the footing 24 by means of nuts 206 threadedly secured to the upstanding ends of the bolts 202. This method of attaching the post 28 to the footing 24 provides that the post 28 can be secured to the footing 24 in a manner to extend upwardly in a substantially vertical position since shims (not shown) can be inserted between the plate 198 and the surface 204 of the footing 24 where desired. The substantially vertical securance of the post 28 to the footing 24 is essential to this invention since the support 12 is desirably placed adjacent to the level ground surface 26 and the clearance between the wheel-supporting members 52 and 54 hereinafter mentioned and the ramp 14 is desirably kept as small as possible, and at the same time, the support is desirably rotatable without engaging either the ground surface 26 or the ramp 14.

Secured to the thrust bearing 32 are four aircraft stalls 36 each of which are substantially identical to each other. Thus, a description of one stall 36 will suffice for each other. Aircraft stalls 36 generally comprise an elongated load-bearing member 38 having one end 40 thereof secured to the thrust bearing 32. Member 38 extends from the thrust bearing 32 and the post 28 radially outwardly therefrom thereby defining a distal end 42 thereof. Secured to member 38 intermediate and spaced apart from ends 40 and 42 is a cross-member 44. Cross member 44 is generally perpendicular to member 38 and extends on both sides of member 38 thereby having opposite distal ends 46 and 48. Similarly secured to member 38 is a second cross member 50. Cross member 50 also extends on both sides of member 38, is generally parallel to member 44, and is spaced apart from and intermediate cross member 44 and distal end 42.

Supported by cross members 44 and 50 are a pair of wheel-supporting members 52, 54 which are respectively positioned on opposite sides of and generally parallel to member 38. Wheel-supporting members 52 and 54 are channel-shaped and the web portion thereof is perforated to allow moisture from the wheels of the aircraft resting thereon to drain therefrom.

Referring now to FIGS. 7 through 10, the specific manner by which the members 52 and 54 are supported will be described. Since the structure supporting both members 52 and 54 are identical a description of one will suffice for the other. Secured to the surface 56 of the cross member 44, which faces the cross member 50, is an angle-support 58 having an upwardly facing flange surface 62 upon which cross members 52 and 54 rest adjacent to ends 94. Support 58 is positioned with respect to the top surface 60 of the member 44 such that the wheel-supporting members 52 and 54 when resting upon the flange surface 62 of the support 58 will be flush with the surface 60. A rectangular notch 70 is provided within the web portions 64, 66 and 68 in which the top portion of cross-member 50 fits. Notch 70 is slightly larger than the cross-sectional size of member 50 thereby preventing the members 52 and 54 from moving off of the support 58. Thus positioned on the support 58 and the member 50, the weight of the members 52 and 54 secure the same in position. However, both members 52 and 54 are slidable along the member 50 and support 58 toward and away from member 38 in order to accommodate the main gear of any particular aircraft. For this reason, the support 58 is provided with a length measured axially of the member 44 which is substantially greater than the width dimension of the members 52 and 54. The weight of members 52 and 54, however, is sufficient to prevent any unintended movement of the type above-described.

Still referring to FIGS. 7 through 10, there is shown the means by which the wheel members 52 and 54 adjacent to the periphery of the support 12 can be selectively raised and lowered. This adjustment in the elevation of the wheel-supporting members 52 and 54 and the distal ends 96 thereof is provided by inserting an angle member 72 having generally the same length as the supports 58 between the member 50 and each of the members 52 and 54. More specifically, the angle member 72 has two flange portions 74 and 76. Flange portion 74 is positioned to overlay a portion of the top surface 78 of the member 50 and the flange portion 76 is positioned to overlay a portion of the side surface 80 which faces outwardly and away from member 44. Both flanges 74 and 76 of member 72 are positioned within the notch 70 of the wheel-supporting members 52 and 54. Secured to the flange 76 of each of the members 72 adjacent to the opposite ends 82 and 84 of the member 50 is a nut 86. Nut 86 is positioned in registry with an opening not shown. Threadedly positioned within the nut 86 is a bolt 88 which can be threadedly moved within nut 86 and through the opening within the flange 76 to abut the end of its stud portion 90 against the side surface 80 of the member 50. When stud portion 90 is abutted against surface 80 of member 50, the angle 72 is cocked in the manner illustrated in FIG. 9 such that the angle 72 forcedly bends the members 52 and 54 adjacent to notch 70 thereby elevating the distal ends 96 thereof. The end 94 of the member 52 and 54 which is adjacent the member 44 and supported by the support 58 remains stationary. Since the distal ends 96 of the members 52 and 54 are elevated a distance proportionally greater than the elevation of the members 52 and 54 adjacent to member 50, distal ends 96 of each of the members 52 and 54 can be raised and lowered a distance sufficient to adjust the elevation of the distal ends 96 as required by selectively adjusting the bolt 88 a relatively small amount.

Secured to the member 38 and extending the entire length thereof is an elongated channel-shaped member 98. Member 98 has its flange portions 100 and 102 upstanding from the member 38 so as to define a continuous upwardly facing groove 104 extending the entire length of the member 38 and radially outwardly of the post 28. Groove 104 at one end is closed by the post 28 and at the other end is closed by a prism-shaped chock or abutment member 106 which is pivotally connected to the distal end 42 of the member 38 by means of a rod 108. Thus connected to the member 38, the chock 106 can be moved between the two positions 110 and 112 shown in FIG. 11. The precise function of the chock 106 in positions 110 and 112 will be mentioned hereinafter.

Thus constructed, each of the stalls 36 of the turntable 12 is adapted to receive an aircraft thereon. Members 52 and 54 are adjustable to be placed in registry with and to support the main gear of the aircraft. And, channel-shaped member 98 is equipped to receive either a nose or tail wheel, as the case may be, within the groove 104. Groove 104 functions to place the aircraft in registry with the members 52 and 54 each time the aircraft is placed upon the stall 36 once the adjustment of the members 52 and 54 has been made.

The stalls 36 are further supported by the post 28 by means of guy wires 114 and 116. Secured to the post 28 adjacent to the top 118 thereof is the collar 120 having an annular flange 122 extending generally perpendicularly from the post 28. Positioned over the collar 10 and resting on the flange 122 is a bearing ring 124 having openings 126 therein. Guy wires 114 and 116 extend between the ring 124 and the opposite ends 46 and 48 of the member 44, respectively, of each of the stalls 36. Specifically one end of the guy wires 114 and 116 is secured to the ring 124 by means of the openings 126 and the other ends of the wires 114 and 116 are secured to the ends 46 and 48 of the member 44 by means of anchors 127. Intermediate the ends of the wires 114 and 116 are positioned, respectively, turn buckles 128 and 130 by which the length of the wires 114 and 116, respectively, can be selectively adjusted so as to minimize the moment about the bearing 32.

Further, each of the stalls 36 is guyed to the adjacent stalls 36 by means of guy wires 132 extended between end 48 of member 44 of one stall 36 and end 46 of member 44 of an adjacent stall 36. Intermediate the opposite ends of the guy wires 132 are positioned turn buckles 134 for selectively adjusting the length thereof to insure that the load bearing members 38 extend from the bearing 32 substantially radially therefrom thereby to minimize strain within the connection between the bearing 32 and the members 38.

Thus constructed, the individual aircraft stalls 36 are connected together and form the aircraft support or turntable 12 which has a construction similar to a carousel and is rotatable about the axis of the post 28. Turntable 12 being generally horizontal is spaced from the ground and unsupported from the ground radially outwardly from the post 28. However, during the positioning of an aircraft on a stall 36 for the unloading of an aircraft therefrom, the turntable 12 is desirably prevented from rotating. This is achieved by an interaction between the turntable 12 and the ramp 14.

Referring now to FIGS. 1, 3, 6, 7, 11 and 12, ramp 14 is shown to have an upwardly facing surface 138 which generally is at the same elevation as the bottom of the groove 104 of the channel-member 98. Adjacent to the peripheral boundary of the turntable 12, ramp 14 has a step 140 which is at an elevation below surface 138. Formed in the ramp 14 adjacent to the upstanding step surface 142 and communicating with both surface 138 and 142 is a groove 144. Groove 144 is centrally located between the opposite ends 146 and 148 of the ramp 14 and extends longitudinally thereof.

During the loading or unloading of an aircraft from a stall 36, the stall 36 is placed in registry with the ramp 14 and locked in that position by moving chock member 106 from the position 110 into the position 112 in which a portion thereof is positioned within the groove 144. With the member 106 in the position 112 within groove 144, turntable 12 is not free to rotate about post 28 and is maintained in registry with the ramp 14. Further, wheel-supporting members 52 and 54 which extend beyond the distal end 42 of the member 38 extend into overlaying relationship with upwardly facing step surface 140. However, both members 52 and 54 if properly adjusted by the means illustrated in FIGS. 8 and 9 and above-described, clear both the surface 140 and the upstanding surface 142 of the ramp 14. However, whenever the major portion of the aircraft in the stall 36 bears upon the wheel-supporting members 52 and 54 intermediate the cross member 50 and the distal ends 96 thereof, members 52 and 54 will be supported by the surface 140. While the upwardly facing surface 160 of the chock member 106 when in the position 112 bridges the gap between the distal end 42 of the member 38 and the surface 138, no such member need be connected to the wheel-supporting members 52 and 54 to bridge the gap between the distal ends 96 and the surface 138 as the wheels of the main gear of the aircraft are sufficiently large enough to bridge the gap therebetween.

Figure 13:
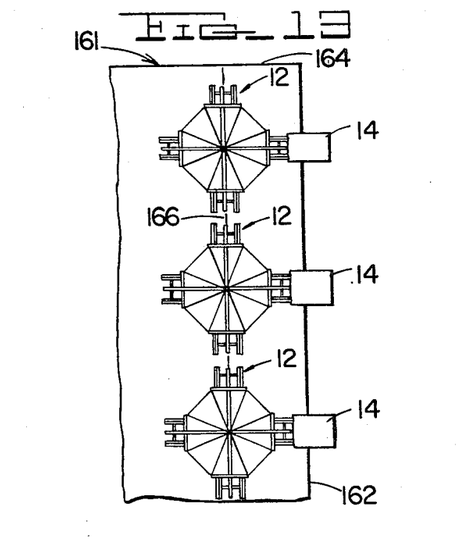
FIG. 13 illustrates a second embodiment of the improved hanger of this invention utilizing the same aircraft support and associated ramp structure illustrated in FIGS. 1 through 12.

Referring now to a second embodiment of the improved hangar of this invention, illustrated in FIG. 13, there is shown a rectangular portion of a building 161 having at least one longitudinal side 162 and a transversely extending side 164. In this second embodiment, a row of turntables 12, of the type above-described, are arranged within the hangar 161 in spaced-apart relation with each other in a manner such that a line 166 drawn through the axis of the post 28 of each turntable 12 is perpendicular to the wall 164 and parallel to the wall 162 of the hangar 161. Further, each of the turntables 12 are positioned adjacent to the longitudinal wall 162 such that a ramp 14 can be constructed and an opening 22 can be provided in the wall 162 for each of the turntables 12. Similar to the openings 22 of the hangar 10, the hanger 161 provides each of the openings 22 with a door 23 for closing the same when desired.

In a specific construction of this invention, the buildings 10 and 161 can be of conventional construction, i.e. the footings 20 and 24 and the ramp 14 can be of poured concrete, the beams 170 and 176, and the purlins 172 and 178 can be made from any rigid, self-supporting and load-bearing material from which structural members can be formed, and the roofing 180, the doors 23 and their accompanying hangars 188 and guides 190, and the upstanding side portions 16 can all be of conventional materials and design. Further, certain portions of the turntable 12 can be of conventional construction. For example, the post 28 and the members 38, 44, 50, 52, 54, 58 and 72 can all be made of any rigid, self-supporting and load-bearing material from which structural members can be formed. Similarly, collars 30 and 31, bearing 32, collar 120 and bearing-ring 124, guy wires 114, 116 and 132 and their anchors 127, and turnbuckles 128, 130 and 134 can be all of conventional materials and design. Members 98, 106, and 154 can be made of any rigid and self-supporting material, however, these materials must be chosen together with materials from which post 28 and the members 38, 44, 50, 52, 54, 58 and 72 are made such that the post 28 and each of the members have a strength required to support the aircraft stored on the turntable 12 during use of the hangar of this invention.

Further, in any specific construction of this invention, the dimensions of the hangar 10 or 161, the turntables 12, and the footings 20 and 24 and the ramp 14 associated therewith are determined by the dimensions of the aircraft intended to be stored within the hangar. Thus, each specific construction of the improved hangar of this invention will vary in dimension and as the aircraft stored in the hangar become larger, the strength required for each of the load-bearing parts, members or beams of the structure above-described will have to be increased, in a manner well known to engineers, architects and builders of similar buildings or structures.

In operation, the improved hangar utilizes hangar space at least as efficiently as conventional T-type hangars and permits each of the aircraft stored within the hangar to be positioned within and removed from the hangar through the same opening 22 and without requiring the moving of adjacent aircraft. Thus, the improved hangar of this invention minimizes the number of doors 23 required for each hangar and minimizes the taxi strip required to connect the hangar to the runway of an airport. All this is achieved by providing a turntable 12 upon which aircraft can be stored. Turntable 12 can be revolved so as to place each of the aircraft stored thereon in registry with the opening 22 of the hangar, and thus, each of the aircraft stored on the turntable 12 can be removed from the hangar nose first through the same opening. Further, the turntable 12 being circular in shape, allows each of the aircraft to be positioned on the turntable 12 with its tail portion adjacent to the center of the turntable 12 thus permitting the aircraft to be removed from the hangar nose first. At the same time, the hangar construction of this invention utilizes the space of the turntable 12 as efficiently as a conventional T-type hangar.

The construction of the turntable 12 is unique in the respect that it is supported only at its center and is unsupported from the ground at all positions radially outwardly from the center of the turntable 12. Thus suspended, the turntable 12 is unaffected by the condition of the ground surface 26 or the freezing and thawing thereof. So long as the footings 20 and 24 function to maintain the post 28 in a substantially vertical position and the ramp 14 stationary, the turntable 12 will remain free from operational difficulties. Even if the post 28 becomes substantially out of a vertical position or the ramp 14 is heaved out of position by frost or otherwise so that the turntable 12 binds and is not freely rotatable, correction of this difficulty simply involves readjusting the elevation of the wheel-supporting members 52 and 54 by the means illustrated in FIGS. 8 and 9 or placing additional shims between the plate 198 and the footing 24 to reposition the post 28 in the desired vertical position. Thus, the improved hangar of this invention is not only relatively maintenance free, but when maintenance is required the maintenance is facilitated by the relatively simple construction thereof.

When positioning a convenitonal gear aircraft 208 onto one of the stalls 36, the turntable 12 is rotated until an empty stall is in registry with the ramp 14 and the chock member 106 is rotated into the position 112 locking the stall 36 in position. The aircraft 208 can then be merely pushed or pulled onto the stall 36. More specifically, the tail wheel of conventional gear aircraft is positioned within the channel member 104 and the aircraft is moved onto the stall 36 until the main gear are adjament the upstanding surface 42 of the ramp 14. In this position, the wheel-supporting members 52 and 54 are adjusted in position longitudinally of the member 50 so as to be in registry with the wheels of the main gear. Then the aircraft 208 is moved the rest of the way onto the stall 36 and into a position such as that illustrated in FIG. 3 in dashed lines. Once the aircraft is assigned to a specific stall 36 and the wheel-supporting members 52 and 54 are adjusted to be in registry with the main gear of the aircraft no further adjustment is necessary.

The aircraft 208 being positioned on the stall 36, the member 154 is moved into the position 156 and the chock member 106 is moved into the position 110 thereby rendering the turntable 12 free to rotate in order to place another stall 36 in registry with the ramp 14. Chock member 106 in position 110 closes the distal end 42 of the member 104.

When an aircraft 209 having tricycle gear is placed upon a stall 36, the aircraft will still be positioned such that the tail portion of the aircraft is adjacent to the post 28 and the nose portion of the aircraft adjacent to the periphery of the turntable 12. In this position, the nose gear of the aircraft will be adjacent to the distal end 42 of the members 38 and 98. In this position, the chock member 106, in the position 110, functions as an abutment member for the nose gear of the aircraft. Chock member 106 closes the distal end 42 of the groove 104 of the member 98 and prevents the nose gear of the aircraft from moving beyond the distal end 42 of the member 98 and from the turntable 12 when not desired.

The improved hangar construction of this invention abovedescribed provides an improved aircraft storage device which can be inexpensively made and constructed and which is relatively maintenance free during use. The hangar of this invention also utilizes hangar space at least as efficiently as the conventional T-type hangars and permits each of the airplanes stored within the hangar to be positioned and removed from the hangar through openings in the same side of the hangar, and without moving the aircraft within the hangar. This permits the hangar of this invention to be backed up to a peripheral boundary of the property on which the hangar is located or to other buildings and provides that a minimum of doors and taxi strip is required for each hangar building made in accordance with this invention.

While there have been described above the principles of this invention in connection with specific apparatus, it is to be clearly understood that this description is made only by way of example and not as a limitation to the scope of the invention.

I claim:

1. A vehicle storage device comprising an upright and substantially rigid post, a footing, said post being connected to said footing, and a turntable connected to said post, said turntable being spaced from the ground, said turntable being unsupported from the ground radially outwardly from said post and being at least partially supported by said post, said turntable having at least one vehicle stall thereon, said stall having an elongated load-bearing member connected to said post, said load-bearing member extending radially outwardly from said post, said stall having two wheel-supporting members on opposite sides of said load-bearing member adjacent to the distal end thereof, first means connected to said load-bearing member for supporting said wheel-supporting members, said wheel-supporting members being in spaced-apart relationship with said load-bearing member, second means for selectively adjusting the spacing between said wheel-supporting members and between said load-bearing member and each wheel-supporting member, third means for selectively raising or lowering said wheel-supporting members, said wheel-supporting and load-bearing members being adapted to support a vehicle, and fourth means connected to said load-bearing member for maintaining the undercarriage of the vehicle supported thereby in registry with said load-bearing and wheel-supporting members.

2. The storage device of claim 1 wherein said first means comprises a first cross-member secured transversely of said load-bearing member at a position spaced-apart from said distal end thereof, a second cross member secured transversely of said load-bearing member at a position intermediate said first cross-member and said distal end, and said second means comprises a support secured to said first cross member and extending toward said second cross-member, said wheel-supporting members each having an inner end and a distal end and an opening therein in which said second cross member is positioned, said opening being intermediate said distal end and the inner end of said wheel-supporting members, respectively, said wheel supporting members adjacent to said inner ends, respectively, being rested on said support, the weight of said wheel-supporting members keeping the same in connected relation with said support and second cross member.

3. The storage device of claim 2 wherein said third means comprises an adjusting member positioned between each of said wheel-supporting members and said second cross member, and fifth means connected to said adjusting members and engaging said second cross member for selectively moving said adjusting members toward and away from said second cross member in a manner selectively spacing each of said wheel-supporting members from said second cross-members, thereby to lower and raise said wheel-supporting members relative to said second cross member whereby said distal ends of said wheel-supporting members are raised and lowered.

4. The storage device of claim 3 wherein said adjusting member is an elongated angle extending transversely of said wheel-supporting members at least for a distance at least equal to the transverse spacing of said wheel-supporting members, said angle having a portion thereof overlaying a part of the top and one side of said second cross member, and wherein said fifth means is a screw member threadedly and respectively connected to said angle portion overlaying the side of said second cross member adjacent to a distal end thereof, the stud portion of said screw members abutting said second cross member side, whereby said screw is threadedly adjustable to selectively cock said angle with respect to said second cross member thereby to selectively raise and lower said wheel-supporting members relative thereto.

5. The storage device of claim 2 wherein said third means comprises an adjusting member positioned between each of said wheel-supporting members and said second cross member; said adjusting member being an elongated angle extending transversely of said wheel-supporting members at least for a distance at least equal to the transverse spacing of said wheel-supporting members, said angle having a portion thereof overlaying a part of the top and one side of said second cross member; further comprising a screw member threadedly and respectively connected to said angle portion overlaying the side of said second cross member adjacent to a distal end thereof, the stud portion of said screw member abutting said second cross member side, whereby said screw is threadedly adjustable to selectively cock said angle with respect to said second cross member thereof, thereby to lower and raise said wheel-supporting members relative to said second cross member whereby said distal ends of said wheel-supporting members are raised and lowered; wherein said fourth means comprises means on said load-bearing member forming an upwardly facing groove extending longitudinally thereof for accommodating a portion of the undercarriage of a vehicle in said stall.

6. The storage device of claim 5 further comprising a hangar connected to and partially supported by said post and enclosing said turntable, and a ramp extending radially outwardly of said turntable from a distance spaced-apart and adjacent to the peripheral edge of said turntable and defining a gap therewith, said ramp having a width allowing only unidirectional traffic to and from said hangar; said ramp having a groove formed therein and a member pivotally connected to said load-bearing member adjacent to the distal end thereof and adapted to be selectively positioned in said groove thereby to hold said turntable stationary relative to said ramp when a said stall is in registry with said ramp for the loading and unloading of said stall, said wheel-supporting members respectively having inner and distal ends, said ramp having a support extending from said ramp toward said turntable at an elevation lower than the surface of said ramp, said support extending below said distal ends of said wheel-supporting members in a spaced-apart relationship therewith thereby providing a clearance therebetween, said distal ends engaging said support and being supported thereby during the loading and unloading of said turntable when the weight of the vehicle supported by said turntable is concentrated between said second cross member and said ramp; further comprising an elongated sheet-like flap hingedly connected to said ramp, said flap being selectively movable into and out of a position in which the flap portion adjacent to the peripheral edge of said flap opposite the hinged connection thereof rests on the distal ends of said wheel-supporting members whereby the gap between said turntable and said ramp is bridged thereby; wherein said post is secured to said footing; wherein said load-bearing member is journaled to said post, whereby said post remains stationary and said turntable revolves about said post; wherein said stall is further supported by guying means extending between said post and said first cross member; wherein said turntable has four stalls, said four elongated load-bearing members, respectively, of said four stalls being secured to a bearing at the base of said post adjacent to said footing to extend from said post at 90 degree intervals; and wherein said hangar is generally circular in shape and has a single opening therein selectively closeable by a door, said opening being in registry with said ramp and of a size permitting a vehicle to be moved therethrough during the loading and unloading of said turntable.

7. The storage device of claim 1 wherein said fourth means comprises means on said load-bearing member forming an upwardly facing groove extending longitudinally thereof for accommodating a portion of the undercarriage in said stall.

8. The storage device of claim 1 further comprising a building enclosing said post and footing and turntable, said building being connected to and partially supported by said post and a ramp extending radially outwardly of said turntable from a distance spaced-apart adjacent to the peripheral edge of said turntable and defining a gap therewith, said ramp having a width allowing only unidirectional vehicle traffic to and from said building, fifth means connected to said load-bearing member of said stall for holding said turntable stationary relative to said ramp when said stall is in registry with said ramp for the loading and unloading of said stall, said wheel-supporting members respectively having inner and distal ends, said ramp having sixth means for supporting the distal ends of said wheel-supporting members, and seventh means connected to said ramp for partially bridging said gap between said ramp and the distal ends of said wheel-supporting members.

9. The storage device of claim 8 wherein said fifth means comprises a groove formed in said ramp, and a member pivotally connected to said load-bearing member adjacent to the distal end thereof and adapted to be selectively positioned in said groove thereby to prevent said turntable from rotating.

10. The storage device of claim 9 wherein said load-bearing member has means forming an upwardly facing groove formed therein for accommodating a part of the undercarriage of a vehicle, said pivoted member being movable between a first position in which a portion of said member is within said groove of said ramp and a second position in which a portion of said member is positioned within said upwardly facing groove of said load-bearing member, said pivoted member being an abutment when in said second position whereby the open end of said upwardly facing groove adjacent to the distal end of said load-bearing member is closed.

11. The storage device of claim 9 wherein said sixth means comprises a support extending from said ramp toward said turntable at an elevation lower than the surface of said ramp, said support extending below said distal ends of said wheel-supporting members in a spaced-apart relationship therewith thereby providing a clearance therebetween, said distal ends engaging said support and being supported thereby during the loading and unloading of said turntable when the weight of the vehicle supported by said turntable is concentrated between said second cross member and said ramp.

12. The storage device of claim 9 wherein said seventh means comprises an elongated sheet-like flap hingedly connected to said ramp, said flap being selectively movable into and out of a position in which the flap portion adjacent to the peripheral edge of said flap opposite the hinged connection thereof rests on the distal ends of said wheel-supporting members whereby the gap between said turntable and said ramp is bridged thereby.

13. The storage device of claim 1 wherein said post is secured to said footing, wherein said load-bearing member is journaled to said post, whereby said post remains stationary and said turntable revolves about said post, and wherein said stall is further supported by guying means extending between said post and said stall.

14. The storage device of claim 1 wherein said turntable has four stalls, said four elongated load-bearing members, respectively, of said four stalls being secured to a bearing at the base of said post adjacent to said footing to extend from said post at 90 degree intervals.

15. The storage device of claim 1 wherein said turntable is supported solely by said post.

16. The storage device of claim 1 further comprising a building enclosing said post and footing and turntable, and a ramp extending radially outwardly of said turntable, wherein said building is generally circular in shape and has a single opening therein selectively closeable by a door, said opening being in registry with said ramp and of a size permitting a vehicle to be moved therethrough during the loading and unloading of said turntable.

17. The storage device of claim 1 further comprising a building enclosing said post and footing and turntable, and a ramp extending radially outwardly of said turntable, wherein said building has a portion thereof generally rectangular in shape, said building having a row of said turntables positioned therein in spaced-apart relation with each other and said building, a line drawn through the axes of revolution of said turntables being parallel, spaced apart from and adjacent to a longitudinal wall of said building, each of said turntables having one of said ramps and a single opening in said building wall associated therewith, said building openings being selectively closeable by a door and of a size permitting a vehicle to be moved therethrough during the loading and unloading of said turntable.

18. A vehicle storage device comprising an upright and substantially rigid post, a footing, said post being connected to said footing, a generally horizontal turntable connected to said post, said turntable being adapted to receive a vehicle thereon, said turntable being rotatable such that a vehicle thereon can be placed in more than a single position; said turntable having at least one vehicle stall, said stall having an elongated load-bearing member connected to said post, said load-bearing member extending radially outwardly from said post, two wheel-supporting members secured to said load-bearing member adjacent to the distal end thereof, said wheel-supporting members being spaced from and on opposite sides of said load-bearing member, respectively, said wheel-supporting and load-bearing members being adapted to support a vehicle, a first cross-member secured transversely of said load-bearing member at a position spaced-apart from said distal end thereof, a second cross member secured transversely of said load-bearing member at a position intermediate said first cross member and said distal end, said two wheel-supporting members being supported by said first and second cross-members, first means for selectively adjusting the transverse spacing of said wheel-supporting members between each other and said load-bearing member, second means for selectively raising and lowering said wheel-supporting members, and third means connected to said load-bearing member for maintaining the undercarriage of the vehicle supported thereby in registry with said load-bearing and wheel-supporting members.

19. A vehicle storage device comprising an upright and substantially rigid post, a footing, said post being connected to said footing, a generally horizontal turntable connected to said post, said turntable being adapted to receive a vehicle thereon, said turntable being rotatable such that a vehicle thereon can be placed in more than a single position; said turntable having at least one vehicle stall, said stall having an elongated load-bearing member connected to said post, said load-bearing member extending radially outwardly from said post, first means secured to said load-bearing member adjacent to the distal end thereof for underlying and supporting the wheels of a vehicle, said wheel-supporting means having portions on opposite sides of said load-bearing member, respectively, said wheel-supporting means and load-bearing member being adapted to support a vehicle, second means connected to said load-bearing member for maintaining the undercarriage of the vehicle supported thereby in registry with said load-bearing member and wheel-supporting means, a ramp extending radially outwardly of said turntable from a distance spaced-apart and adjacent to the peripheral edge of said turntable and defining a gap therewith, said ramp having a width allowing only unidirectional vehicle traffic to and from said turntable, and third means for positioning said wheel-supporting means relative to said ramp whereby said ramp and said wheel-supporting means can be positioned to approximate portions of a continuous surface.

References Cited

UNITED STATES PATENTS

| | | | |
|---|---|---|---|
| 636,324 | 11/1899 | Ehrenberg | 214—16.11 |
| 1,225,030 | 5/1917 | Haynes | 104—44 |
| 1,813,460 | 7/1931 | Mugler | 104—44 |
| 1,855,534 | 4/1932 | Williams | 214—16.11 |
| 2,689,986 | 9/1954 | Bedwell | 52—83 |
| 2,964,144 | 12/1960 | Wheeler | 214—16.11 |
| 3,299,588 | 1/1967 | Arnold | 52—65 |

FOREIGN PATENTS 11,692      1880     Germany.

HENRY C. SUTHERLAND, *Primary Examiner.*